United States Patent [19]
Smoliar et al.

[11] Patent Number: 6,010,557
[45] Date of Patent: Jan. 4, 2000

[54] APPARATUS SYSTEM AND METHOD FOR REDUCING CONTAMINATION AT THE HEAD-DISC INTERFACE IN A HARD DISC DRIVE CASING

[75] Inventors: Laura Ann Smoliar, Palo Alto; Jing Gui, Fremont, both of Calif.

[73] Assignee: Seagate Technology, Inc., Scotts Valley, Calif.

[21] Appl. No.: 09/066,008

[22] Filed: Apr. 24, 1998

Related U.S. Application Data

[60] Provisional application No. 60/067,681, Dec. 5, 1997.

[51] Int. Cl.[7] .................................................. B01D 53/04
[52] U.S. Cl. ............................ 95/116; 55/385.6; 95/141; 96/108; 96/135; 96/153
[58] Field of Search ............................ 96/153, 147, 108, 96/135; 55/385.6; 95/116, 141

[56] References Cited

U.S. PATENT DOCUMENTS

| | | |
|---|---|---|
| 4,418,369 | 11/1983 | Applequist et al. .................... 55/385.6 |
| 4,489,356 | 12/1984 | Farmer .................................... 55/385.6 |
| 4,581,668 | 4/1986 | Campbell ................................. 55/385.6 |
| 4,657,570 | 4/1987 | Gronholz et al. ....................... 55/385.6 |
| 4,684,510 | 8/1987 | Harkins ................................... 55/385.6 |
| 4,857,087 | 8/1989 | Bolton et al. ........................... 55/385.6 |
| 4,863,499 | 9/1989 | Osendorf ................................. 55/385.6 |
| 5,030,260 | 7/1991 | Beck et al. .............................. 55/385.6 |
| 5,124,856 | 6/1992 | Brown et al. ........................... 55/385.6 |
| 5,447,695 | 9/1995 | Brown et al. ........................... 55/385.6 |
| 5,538,545 | 7/1996 | Dauber et al. .......................... 55/385.6 |
| 5,593,482 | 1/1997 | Dauber et al. .......................... 55/385.6 |
| 5,734,521 | 3/1998 | Fukudome et al. ..................... 55/385.6 |

Primary Examiner—Duane S. Smith
Attorney, Agent, or Firm—Merchant & Gould P.C.

[57] ABSTRACT

The present specification discloses an apparatus for reducing contamination at the head-disc interface. The preferred embodiment of the invention involves a data storage system for use in an environment where gaseous contaminants are present. The gaseous contaminants have a vapor pressure and a chemical composition. The data storage system has a housing. To attract gaseous contaminants present within the housing interior, a material is disposed within the housing interior. This material creates a competitive absorption or adsorption site for the gaseous contaminants.

21 Claims, 4 Drawing Sheets

APPARATUS SYSTEM AND METHOD FOR REDUCING CONTAMINATION AT THE HEAD-DISC INTERFACE IN A HARD DISC DRIVE CASING

CROSS-REFERENCE TO RELATED APPLICATIONS

This invention relates to Provisional Application Serial No. 60/067,681, filed Dec. 5, 1997. The contents of that application are incorporated by reference herein.

BACKGROUND OF THE INVENTION

1. Field of the Invention

This invention relates generally to a data storage system, and in particular embodiments to a system, apparatus, and process for reducing contamination at the head-disc interface.

2. Description of Related Art

Modern computers use various forms of persistent storage media to store electronic information, such as computer data files or program files. One common form of storage media is a hard disc drive. Since important data may be stored on the drive permanently, precautions are taken to ensure that drives function properly. However, despite these preventive measures, drives often fail.

A drive failure may be the result of a hardware problem, such as stiction. Stiction is short for static friction. It occurs when a head of a drive becomes stuck to a disc surface. Stiction is typically caused by one or both of two different sources. The first source is improper lubrication on the drive's disc. This type of stiction usually occurs when the drive is powered up and the heads cannot break free from the discs. The second source is contamination. This type of stiction occurs when contaminants within the drive environment (such as those that outgas from the motor) gather at the head-disc interface and cause the head and disc to stick together.

There are numerous sources of contamination, such as adhesives, oils, and greases used on the different mechanical components of the drive. Even the labels used on the wires and packaging material can lead to contamination problems. Yet, it is usually the case that the head-disc interface can withstand a certain level of contamination. If this threshold amount is exceeded, the interface is prone to failure. In closed confines of a disc drive housing, contaminants tend to accumulate and eventually exceed the threshold amount, resulting in failure.

One major source of contamination is the disc drive's motor. Although there is an effort to minimize the amount of outgassing from components such as the motor, it may not be possible to entirely eliminate it. When the contamination level reaches a certain threshold, gaseous contaminant droplets can form that interfere with the proper functioning of the head-disc interface.

Thus, there is a need in the art for a method of preventing drive failure by reducing the amount of contamination at the head-disc interface.

SUMMARY OF THE DISCLOSURE

To overcome the limitations in the prior art described above, and to overcome other limitations that will become apparent upon reading and understanding the present specification, the specification discloses a preferred apparatus for reducing contamination at the head-disc interface.

The preferred embodiment of the present invention involves a data storage system for use in an environment where gaseous contaminants are present. The gaseous contaminants have a vapor pressure and a chemical composition.

The data storage system is preferably composed of a housing with an interior and an interior surface. Data storage components reside within the housing interior. These components may include, among others, a hard disc, a head, a head support and movement assembly, and a disc motor.

To minimize the adverse effects of gaseous contaminants present within the housing interior, a porous material is disposed within the housing interior on at least one of the interior surfaces of the housing or on at least one of the disc drive components within the housing. The porous material has a plurality of pores having pore sizes selected for reducing the vapor pressure of the gaseous contaminant.

In further preferred embodiments of the present invention, a chemically treated material is disposed within the housing interior, for example on at least one of the interior surfaces of the housing or on at least one of the disc drive components within the housing. The chemically treated material has a chemical composition selected to cause the gaseous contaminant to stick to the chemically treated material.

An objective of an embodiment of the present invention is to provide competitive absorption and/or adsorption sites for gaseous contaminants. Such sites minimize the accumulation of contaminants at the head-disc interface.

Various advantages and features of novelty which characterize the invention are pointed out with particularity in the claims annexed hereto and form a part hereof. However, for a better understanding of the invention and its advantages, reference should be made to the drawings which form a further part hereof, and to accompanying descriptive matter, in which there is illustrated and described specific examples in accordance with preferred embodiments of the invention.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description of preferred embodiments, reference is made to the accompanying drawings which form a part hereof, and in which is shown by way of illustration a specific embodiment in which the invention may be practiced. It is to be understood that other embodiments may be utilized and structural changes may be made without departing from the scope of the preferred embodiments of the present invention.

Overview

Preferred embodiments of the present invention relate to systems, processes, and apparatuses for reducing the level of contamination at a head-disc interface by providing competitive absorption and adsorption sites for gaseous contaminants.

Hardware Environment

Figure 1:
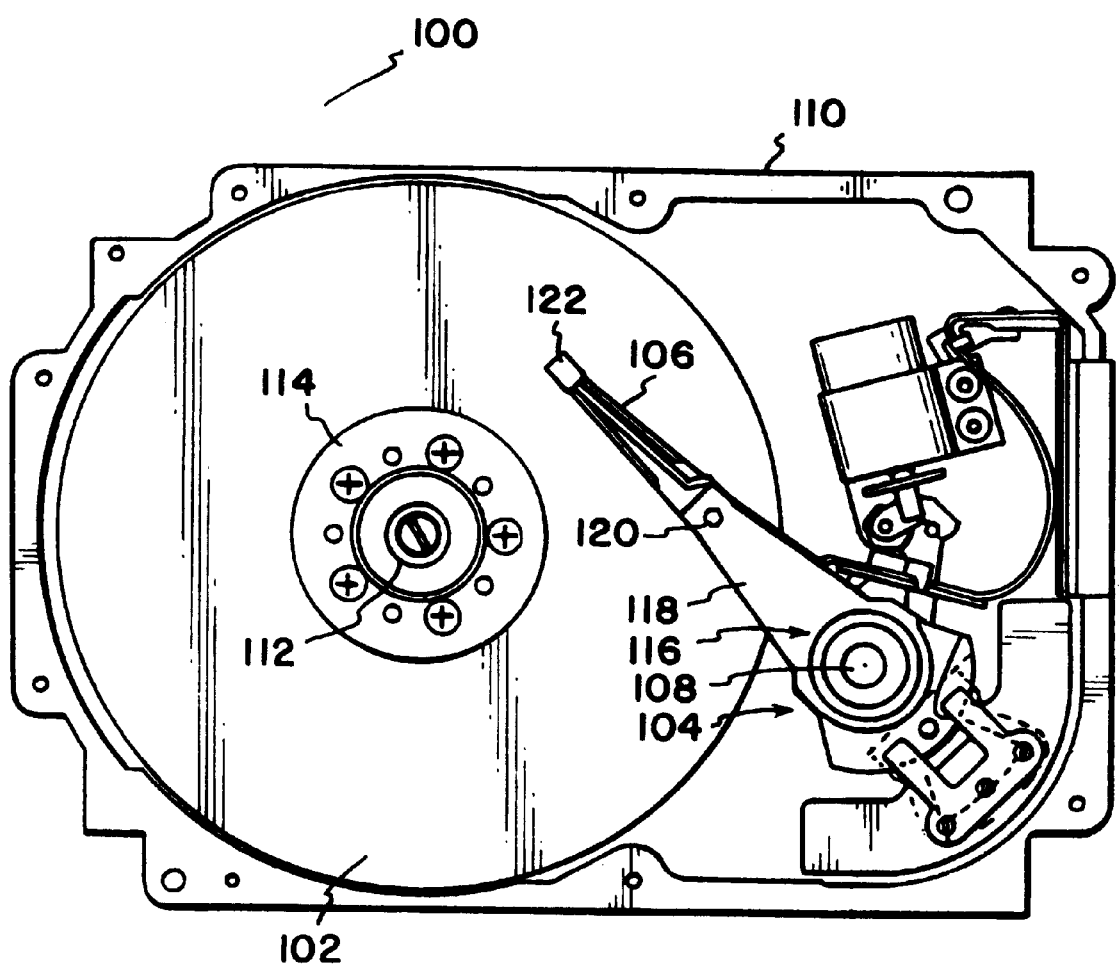
FIG. 1 illustrates an exemplary hard drive system used to implement a preferred embodiment of the present invention.

FIG. 1 illustrates an exemplary hard disc drive system that could be used to implement embodiments of the present invention. In the exemplary environment, a hard drive system 100 has at least one storage medium 102, an actuator assembly 104, a head assembly 106, and a spindle motor (not shown). The actuator assembly 104 is pivotally mounted to a pivot shaft 108 within a housing 110 adjacent to a stack of storage media 102. The housing 110 is an interior compartment surrounded by housing walls. These storage media 102 are clamped onto a shaft 112 of a spindle motor by a spacer bushing 114, with the storage media 102 being oriented in the stack more or less uniformly spaced from one another. The bushing 114 is, of course, rotatable with the storage media 102 and the shaft 112 of a spindle motor which drives the stack of storage media 102 in unison.

The actuator assembly 104 has an actuator 116 and an arm assembly 118 that extends toward the stack of storage media 102. The arm assembly 118 includes a plurality of head carriers 120 which each support a head assembly 106. These head assemblies 106, in turn, support electromagnetic heads 122 which are capable of reading and writing data on the respective storage media 102 as the heads 122 traverse the storage media 102 in response to movement of the actuator assembly 104.

In the embodiment shown in FIG. 1, the storage media 102 includes multi-track magnetic recording discs. Each disc has two recording surfaces (double sided) on which data may be written and/or read by the associated head 122. However, storage media 102 may be any suitable storage device, including but not limited to single sided storage devices. Additionally, other embodiments may employ alternative forms of storage media 102 that operate with heads 122.

The head assembly 106 is designed aerodynamically so that the head 122 is supported adjacent the storage medium 102 surface on an air bearing (or air cushion) created by the spinning storage medium 102. Stiction exists when the heads 122 improperly stick to the storage media 102.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Identifying Contaminants

Frequently, the root cause of stiction at the head-disc interface is hydrocarbon contamination. Hydrocarbon contamination is consistent with outgassing from the disc drive's motor. When the contamination level reaches a certain threshold, gaseous contaminant droplets can form on various components within the disk drive housing. As such droplets accumulate on the disc surfaces and heads, stiction may occur, as described above.

Besides hydrocarbons, other contaminants include organic acids, inorganic acids, or ionic composition. These contaminants are found in adhesives, oils, and greases used on the different data storage components. Contamination problems may even stem from the labels used on the drive's wires and packaging materials.

Figure 2:
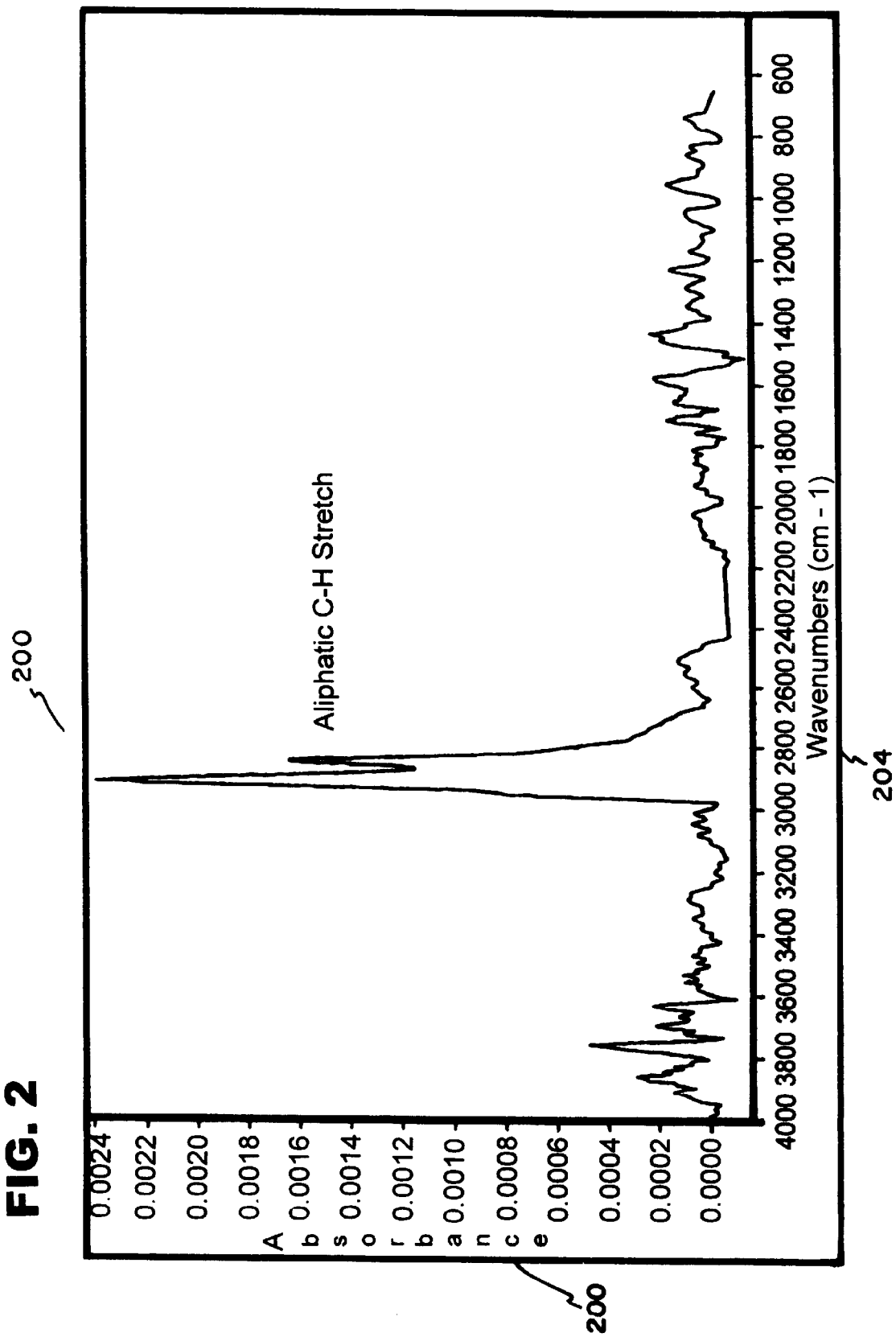
FIG. 2 illustrates an exemplary FTIR spectrum of a contaminant found to cause stiction in a typical hard drive device.

Contaminants may be identified by using an FTIR spectrum. They may also be identified by comparing the chemical compositions of unknown contaminants to the chemical compositions of known contaminants or by other tests. In FIG. 2, an FTIR spectrum 200 is used to identify contaminants that accumulate at the head-disc interface. Each contaminant has a unique FTIR spectrum 200, with specific absorption lines for specific functional groups in the contaminant molecule. For example, in FIG. 2, the organic hydrocarbon compound aliphatic C—H has a stretch at absorbency of 0.0024 at 2900 (cm−1). Once a contaminant is identified, a competitive absorption site can be designed.

Competitive Absorption and Adsorption Sites

Receptive materials chosen to absorb or adsorb a contaminant are selected based on the containment type. For example, in the preferred embodiment of the present invention, a competitive absorption site is composed of a porous material disposed within the drive's housing. In one embodiment, the material may be applied as a layer or coating on an inside surface of a housing wall. In another embodiment, the material may be applied on a component of the disc drive device within the housing. In a further embodiment, the material may be provided as a separate member, such as a plate coated with the material or a plate formed of the material, disposed within the disc drive housing. The material may have pores that are of equal diameter or the material may have pores of varying diameters. The pore size is related to the identified contaminant.

As noted above, each contaminant, if unchecked, tends to form contaminant droplets at the head-disc interface. The droplet size varies with the contaminant's vapor pressure. The pore size is designed to enclose an identified contaminant droplet and reduce its local vapor pressure.

Figure 3:
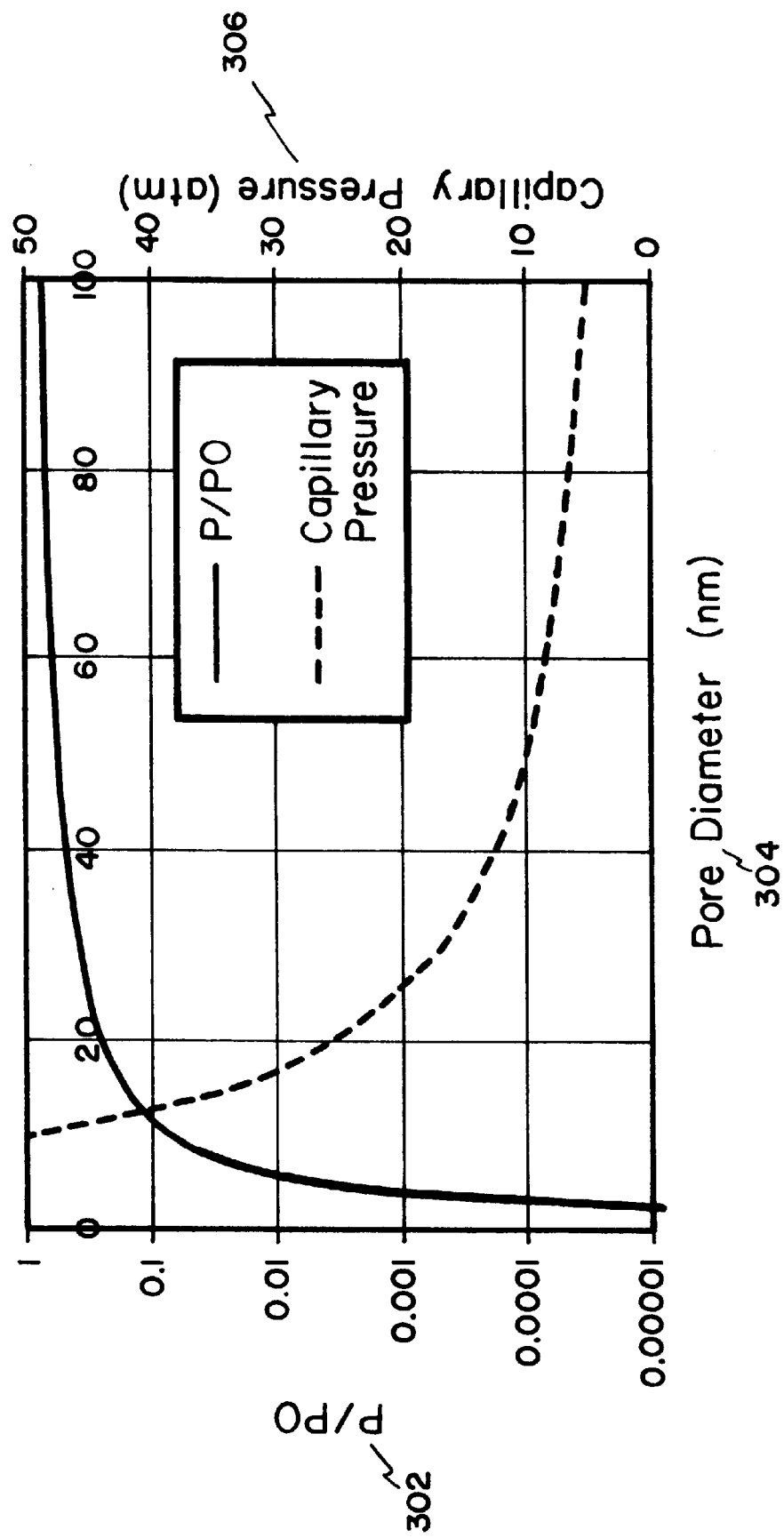
FIG. 3 is a graph of the vapor pressure of an exemplary gaseous contaminant.

FIG. 3 is a graph of the vapor pressure 300 of an exemplary gaseous contaminant. The left side of the graph displays P/P0 302 versus pore diameter 304. P/P0 is a normalized vapor pressure—universal for all contaminants (P0 is used when there is no pore.) FIG. 3 describes a surface phenomenon, which becomes more pronounced as surface-to-volume ration increases (of the pore). As the pore size decreases, its surface-to-volume ratio increases. The effect is stronger between 0 and 20 nm pore size due to the nonlinear dependence of pore size. The right side of the graph displays the capillary pressure 306 versus the pore diameter 304. For capillary pressures 306 ranging between 0 atm to 40 atm, the pore diameter 304 ranges from approximately 2 nm to 10 nm. For capillary pressures 306 ranging between 40 atm and 50 atm, the pore diameter 304 increase from 10 nm to 100 nm.

In an alternative preferred embodiment of the present invention, the competitive adsorption site is composed of a chemically treated material disposed within the drive's housing. In one embodiment, the material may be applied as a layer or coating on an inside surface of a housing wall. In another embodiment, the material may be applied on a component of the disc drive device within the housing. In a further embodiment, the material may be provided as a separate member, such as a plate coated with the material or a plate formed of the material, disposed within the disc drive housing. The chemical composition of the material causes the gaseous contaminant to stick to the chemically treated material. Once the chemical composition of the contaminant is identified, the chemical composition of the material is chosen. For example, when the contaminant is a positive ionic charged compound, the chemically treated material is composed of a negative ionic charged compound. Additionally, the material may have a single chemical composition or it may have a mixture of several different chemical compositions.

In a further embodiment of the preferred embodiment of the present invention, a mixture of porous and chemically treated material can be used to effectively trap contaminants known to cause stiction at the head-disc interface.

Figure 4:
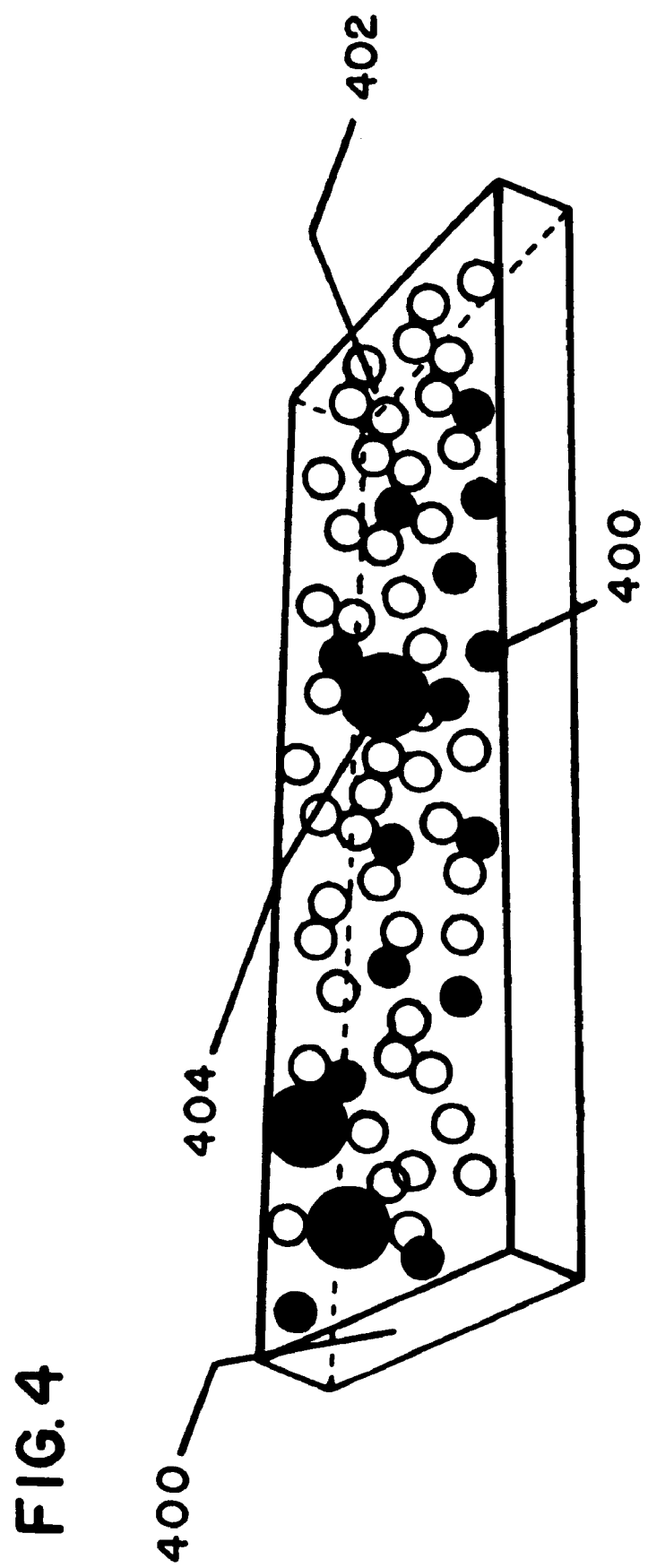
FIG. 4 illustrates a mixed porous material and chemically treated material according to an embodiment of the present invention.

FIG. 4 illustrates a mixed porous material and chemically treated material according to an embodiment of the present invention. In this embodiment, the mixed porous material and chemically treated material is disposed on a disc drive casing cover 400. An optimal pore size 402 is shown as a small uncolored circle. An alternative pore size 404 is represented by a large blackened circle. A chemically treated section 406 is shown as a small blackened circle. Note that the chemically treated sections 406 can be a mixture of several different chemical compositions.

Conclusion

This concludes the description of the preferred embodiment of the invention. The present specification discloses an apparatus for reducing contamination at the head-disc interface.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A data storage system for use in an environment in which a gaseous contaminant is present, comprising:
    a housing having an interior containing at least one data storage medium and at least one reading and/or writing head, wherein the interior includes an interior surface; and
    a receptive material disposed within the housing interior for receiving the gaseous contaminant, wherein the receptive material is applied as a coating to the interior surface of the housing.

2. A data storage system for use in an environment in which a gaseous contaminant is present, wherein the gaseous contaminant has a vapor pressure and a chemical composition, the data storage system comprising:
    a housing having an interior and at least one interior surface;
    one or more data storage components within the housing interior; and
    a receptive material for receiving the gaseous contaminant, wherein the receptive material is disposed within the housing interior and is applied to at least one of the data storage components as a coating and applied to the interior surface as a coating within the housing interior.

3. The data storage system of claim 2, wherein the receptive material comprises a porous material, the porous material having a plurality of pores, wherein the pores have an associated pore size for reducing the vapor pressure of the gaseous contaminant.

4. The data storage system of claim 3, wherein the pores reduce the vapor pressure of the gaseous contaminant that is selected from a group consisting of a hydrocarbon, organic acid, inorganic acid, or an ionic composition.

5. The data storage system of claim 3, wherein each pore is designed to absorb the gaseous contaminant, said gaseous contaminant forms a plurality of contaminant droplets, each contaminant droplet has a droplet size.

6. The data storage system of claim 5, wherein the pore size is related to the droplet size.

7. The data storage system of claim 2, wherein the porous material is chemically coated such that the gaseous contaminant sticks to the porous material.

8. The data storage system of claim 2, wherein the receptive material comprises a chemically treated material the chemically treated material having at least one chemical composition, wherein the chemical composition causes the gaseous contaminant to stick to the chemically treated material.

9. The data storage system of claim 8, wherein the chemically treated material causes the gaseous contaminant, which is selected from a group consisting of a hydrocarbon, organic acid, inorganic acid, or an ionic composition, to stick to the chemically treated material.

10. The data storage system of claim 9, wherein the chemical composition of the chemically treated material is related to the chemical composition of the gaseous contaminant, such that the chemical composition of the chemically treated material is designed to adsorb the gaseous contaminant.

11. The data storage system of claim 8, wherein the chemically treated material comprises a first chemically treated material with its associated chemical composition and a second chemically treated material with its associated chemical composition, such that the first chemically treated material and the second chemically treated material have different chemical compositions.

12. The data storage system of claim 8, wherein the chemically treated material is a porous material having a plurality of pores for reducing the vapor pressure of the gaseous contaminant.

13. A method for reducing contamination in a data storage system for use in an environment in which a gaseous contaminant is present, wherein the gaseous contaminant has a vapor pressure and a chemical composition, comprising the steps of:
    providing a housing having an interior, at least one interior surface, and one or more data storage components within the housing interior;
    identifying the gaseous contaminant within the housing interior;
    selecting a receptive material, wherein the receptive material is related to the gaseous contaminant; and
    disposing the receptive material within the housing interior and coating the receptive material onto at least one of the data storage components within the housing interior.

14. The method of claim 13, wherein the step of selecting comprises selecting a porous material, the porous material having a plurality of pores, wherein the pores have an associated pore size for reducing the vapor pressure of the gaseous contaminant.

15. The method of claim 13, wherein the step of selecting comprises selecting pores that reduce the vapor pressure of the gaseous contaminant, wherein the gaseous contaminant is selected from a group consisting of a hydrocarbon, organic acid, inorganic acid, or an ionic composition.

16. The method of claim 13, wherein the step of selecting comprises selecting a porous material such that each pore is designed to absorb the gaseous contaminant, said gaseous contaminant forms a plurality of contaminant droplets, each contaminant droplet has a droplet size.

17. The method of claim 16, wherein the step of selecting comprises selecting a porous material such that the pore size is related to the droplet size.

18. The method of claim 13, wherein the step of selecting comprises selecting the porous material such that the porous material is chemically coated and the gaseous contaminant sticks to the porous material.

19. The method of claim 13, wherein the step of selecting comprises selecting a chemically treated material, the chemically treated material having at least one chemical composition, wherein the chemical composition causes the gaseous contaminant to stick to the chemically treated material.

20. The method of claim 19, wherein the step of selecting comprises selecting a chemically treated material from a group consisting of a hydrocarbon, organic acid, inorganic acid, or an ionic composition.

21. A data storage system as claimed in claim 1, wherein at least a portion of the receptive material is absorbed into the interior surface.

* * * * *